Aug. 6, 1968   H. SCHAFER   3,395,979
PROCESS FOR THE CONVERSION OF CALCIUM ACID PHOSPHATE
DIHYDRATE TO CALCIUM ACID PHOSPHATE
Filed Dec. 23, 1966   2 Sheets-Sheet 2

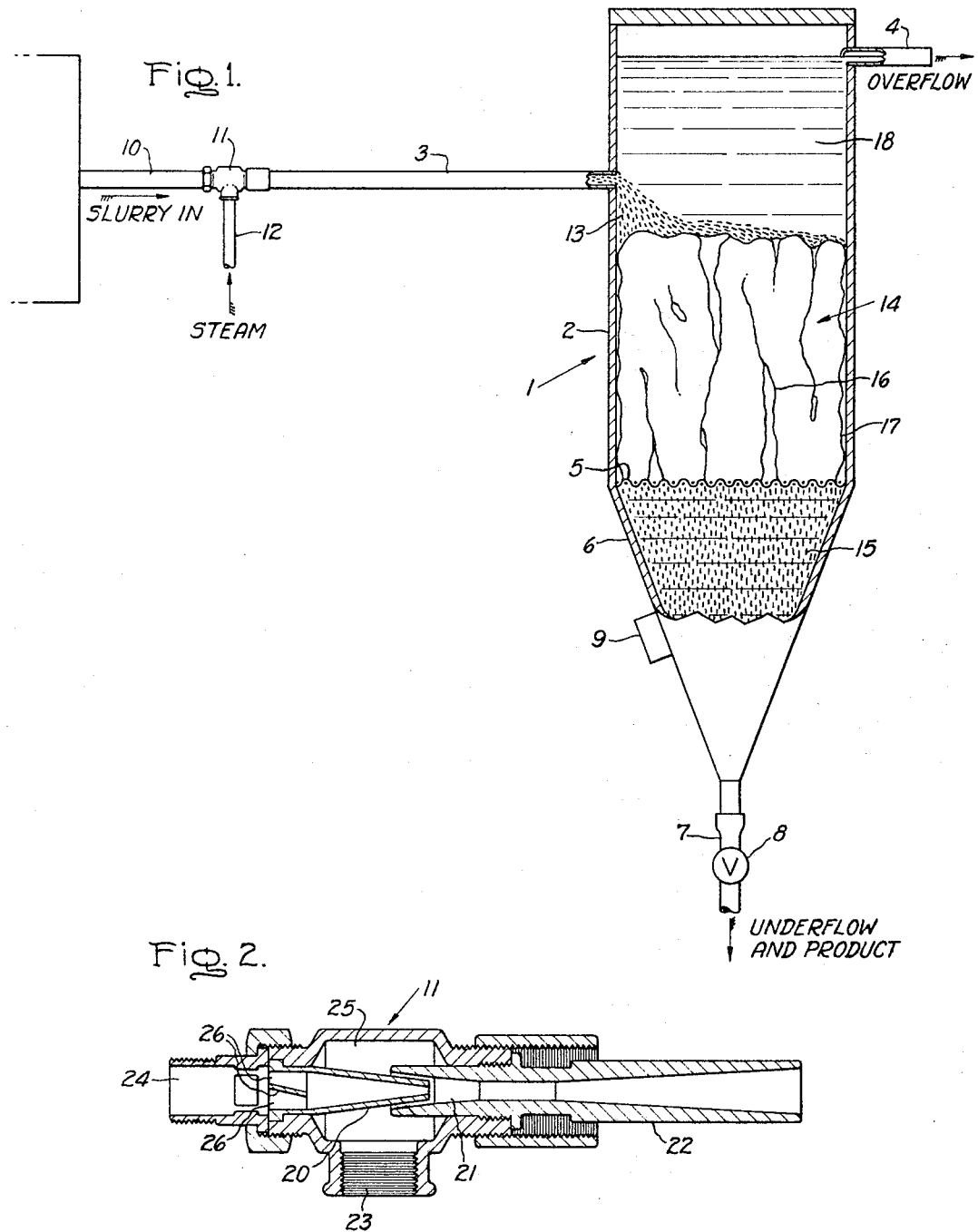

FLOW SHEET
PHOSPHOR PRODUCTION AND USE

FREQUENCY PLOTS OF COULTER COUNTER
DATA FOR RECRYSTALIZED $CaHPO_4$

Inventor:
Halbert Schafer
by Richard H. Burgess
His Attorney 3,395,979
PROCESS FOR THE CONVERSION OF CALCIUM ACID PHOSPHATE DIHYDRATE TO CALCIUM ACID PHOSPHATE
Halbert Schafer, Eastlake, Ohio, assignor to General Electric Company, a corporation of New York
Filed Dec. 23, 1966, Ser. No. 604,473
6 Claims. (Cl. 23—108)

ABSTRACT OF THE DISCLOSURE

A process for the conversion or recrystallization of $CaHPO_4 \cdot 2H_2O$ into $CaHPO_4$ wherein the $CaHPO_4 \cdot 2H_2O$ is heated into the desired temperature range and allowed to form a gel column supported on a screen in a reaction vessel. As the conversion occurs, crystals of $CaHPO_4$ fall through the screen and are separated from the gel before growing to undesirable sizes or size distributions. Continuous recrystallization is made practical by this process. The product is an improved intermediate for phosphor production. Steam injection heating of the slurry in constricted flow is preferred.

Background of the invention

This invention relates to a process for producing $CaHPO_4$ of improved particle size and distribution for use in the production of phosphors. More particularly, it relates to such a process involving conversion of $CaHPO_4 \cdot 2H_2O$ to $CaHPO_4$.

Phosphors based on calcium halophosphate are used for light production in fluorescent lamps. These phosphors can be represented by the general formula

$$Ca_5(PO_4)_3(Cl,F):Sb, Mn$$

The antimony and manganese are used in activator proportions and have major effects on efficiency and color of the light produced. Present commercial practice for the preparation of such phosphors includes mixing together powdered raw materials to provide the required proportions and firing to produce the phosphor. The most satisfactory ingredients for providing reproducible and controlled compositions are usually $CaHPO_4$, $CaCO_3$, $CaF_2$, $NH_4Cl$, $Sb_2O_3$, and $MnCO_3$. These materals are normally reacted to form the phosphor by heating at a temperature generally in the range of 1100–1200° C., for periods ordinarily between one-half hour and three hours. Firing may be in covered vessels in air whereby the reactants generate atmospheres protective against deleterious oxidation or reduction, or in open vessels in a furnace provided with an inert atmosphere.

The particle size distribution of the resultant phosphor is controlled for efficient production of lamps having optimum light output. Since the predominant ingredient in the production of such phosphors is $CaHPO_4$, its particle size is quite important in determining the particle size of the phosphor produced from it.

Previous methods for the production of $CaHPO_4$ have generally required batch rather than continuous processing, resulting in less favorable process economics. Also, past attempts to produce $CaHPO_4$ continuously have generally given undesirable particle sizes and size distributions.

A process previously used to convert $CaHPO_4 \cdot 2H_2O$ to $CaHPO_4$ involves rapidly heating an aqueous slurry of $CaHPO_4 \cdot 2H_2O$ with vigorous agitation into the temperature range in which desirable conversion occurs. This conversion is often referred to as recrystallization, however, the exact mechanism of the conversion is not known. The $CaHPO_4 \cdot 2H_2O$ slurry greatly increases in viscosity as temperature is raised above about 60–65° C. and an amorphous gel phase is formed. Because of the gel formation and associated viscosity increase, agitation and consequently heat transfer into the material is made difficult. However, after the slurry has been raised to a temperature in the region of 78–95° C. and held there for an unpredictable incubation time, which can vary from a few minutes to an hour or more, crystals of anhydrous $CaHPO_4$ begin to form, and the gel breaks down to those crystals and water. Below 78° C., the conversion rate is too slow to be practical. Between 78° C., and 82° C., the rate is much faster and conversion generally will occur within 30 to 90 minutes after temperature is reached. The product is clear transparent crystals whose overall dimensions are quite rectangular. As the temperature is raised above 82° C., the conversion rate becomes much faster and the crystals become much less rectangular and more square in appearance. Above 88° C., the conversion occurs in a few minutes and the product is essentially all square plates.

Thus, it will be seen that if there is a large temperature differential across the gel, the rate of nucleation and crystal growth and crystal morphology will vary at different locations in the vessel. It is desirable to heat the entire reaction mixture to the temperature which causes conversion to the desired crystal formation as quickly as possible and to have the entire reaction mixture at that temperature before conversion occurs. Thermal homogeneity will aid in producing crystals with the preferred narrow particle size distribution.

The particle sizes and distributions of the $CaHPO_4$ produced depend somewhat on the nature of the $CaHPO_4 \cdot 2H_2O$ used; however, the effects cannot presently be predicted from analysis of the $CaHPO_4 \cdot 2H_2O$. The $CaHPO_4 \cdot 2H_2O$ crystals may be various mixtures of acicular, regular, and agglomerated types and still produce good $CaHPO_4$. Suitable $CaHPO_4 \cdot 2H_2O$ can be produced by reacting $CaCl_2$, $H_2O$, and $(NH_4)_2HPO_4$ to precipitate this starting material. This then can be converted to $CaHPO_4$ in the manner described above for the prior art. Subsequent steps in processes for producing phosphors from this material and its use in making lamps will be described in broad outlines along with the description of preferred embodiments of the present invention.

Summary of the invention

A primary object of the present invention is to provide an efficient and practical process for the conversion of $CaHPO_4 \cdot 2H_2O$ into $CaHPO_4$ of desired crystal particle size and size distributions, which process can be operated continuously or semi-continuously.

Further objects and advantages of the invention will appear from the following detailed description of species thereof and from the accompanying drawings.

Briefly stated, the present invention provides in one of its aspects such a process wherein an aqueous slurry of $CaHPO_4.2H_2O$ starting material is heated rapidly to the desired temperature of at least about 78° C. and preferably in the range of 85–99° C. and conveyed to a reaction vessel where it is allowed to set up into a gel-like material which is supported on a perforated member such as a screen at the bottom of the reaction vessel. Pressurized heating could permit the effective use of temperatures of 100° C. or more. Although it is generally not necessary to add heat to the reaction vessel, it might be desirable with some sizes and configurations of vessels. The conversion to $CaHPO_4$ occurs at the screen with crystals falling through the perforations as they are formed in a manner such that the amount of crystal growth is quite uniform, resulting in a narrow particle size distribution. An endothermic phenomenon occurs at the screen, indicating that to be the main situs of the conversion. Once the crystals have fallen through the perforation into the water beneath the screen, they are no longer in contact with the converting gel, and thus do not grow any further. A conical bottom on the reactor under the screen and a source of vibration can aid in moving the slurry of converted product out through the bottom of the vessel. Underflow of slurry of converted product can be regulated so that excess water from the conversion is removed through an overflow pipe above the inlet. Excess water produced by the conversion can percolate upwardly through fissures in the gel column and around it to the area above the gel. It is preferable for the heated slurry to enter the vessel beneath the surface of the excess water to aid in containing any occasional steam bursts from the heater.

Preferably, the starting material is heated by injection of steam into a constricted stream of the slurry moving rapidly and under pressure. The steam would be added in the same direction as the stream is moving. The combination of pressure, movement and turbulence apparently is effective in preventing gelation until the material has come to rest in the reactor.

Brief description of the drawings

FIG. 1 is an elevation, partly in section, of a reactor being used in accordance with the present invention, and showing the general relationship of the preferred heater to the reaction vessel.

FIG. 2 is a sectional view of a steam injection heater useful in the preferred embodiment of the process of the invention.

Description of the preferred embodiment

Figure 3:
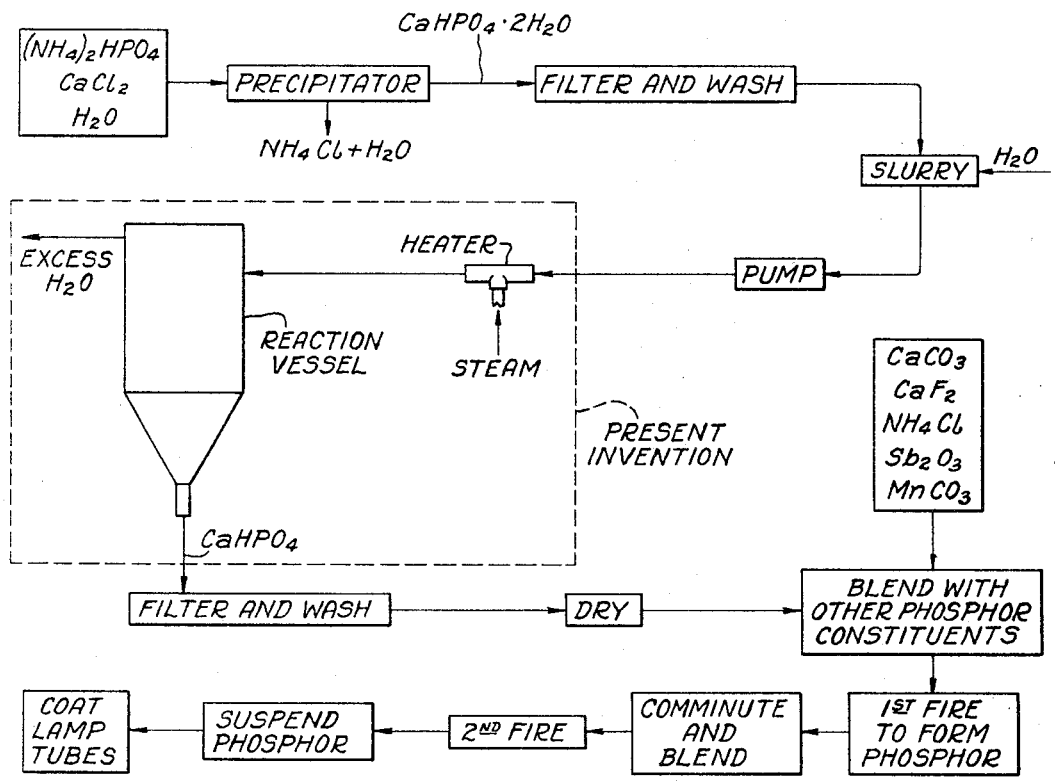
FIG. 3 is a flow sheet of phosphor production and use showing the relationship of the steps of the present invention to an overall process producing and using calcium halophosphate phosphors.

Turning now to the drawings, FIG. 1 illustrates the critical aspects of the invention in one embodiment. The reaction vessel indicated at 1 comprises an upper section 2 which is generally cylindrical and has inlet means 3 and overflow means 4. A perforated member 5 is provided, suitably No. 4 mesh in the Tyler standard screen scale, with 0.185 inch square openings, small enough to support a column of gel 14 formed by the materials being reacted and large enough so that the product produced, crystals of $CaHPO_4$ 15, can fall through the screen. Although the maximum mesh size depends on the height of the gel column and its consistency, 0.2 inch square seems to be a preferred maximum. Beneath the screen 5 is preferably a conical portion 6 opening upwardly and forming the bottom of reaction vessel 1. This portion 6 discharges an underflow at its lower end 7 through underflow valve 8 which can be regulated to control the relative proportions of underflow and overflow.

An aqueous slurry of $CaHPO_4.2H_2O$ is provided through pipe 10 to steam injection heater 11. Steam is injected through pipe 12 to heat the slurry to the desired temperature range while it is within a constricted pipe and under pressure. The heated slurry is thus forced out through pipe 3 into the upper portion 2 of reaction vessel 1. The entry port from pipe 3 is preferably below the surface of water 18 in the vessel. The slurry gradually falls downwardly and converts into a gel illustrated at 14. This gel apparently is penetrated by fissures 16 and has open spaces 17 around its sides which allow excess water from the conversion of $CaHPO_4.2H_2O$ to percolate upwardly to the overflow 4. The desired amount of water can thus be permitted to flow downwardly from the screen 5 on conversion of the starting material to the desired $CaHPO_4$ particles 15. The vibrator 9 on the lower conical portion 6 of the reactor can aid in assuring movement of the converted slurry through the underflow valve 8.

Preferably, the slurry provided through pipe 10 has from 10 to 12 weight percent $CaHPO_4.2H_2O$ suspended in water. Valve 8 is preferably regulated to provide an overflow to underflow volume ratio of about 3:1 with all the recrystallized product being removed through underflow 7.

The slurry provided through pipe 9 can be pumped from a vat with a Moyno pump or other suitable pump, and the rate of inflow through inlet 3 can be adjusted to give the 15 to 20 minutes of residence time in the reactor generally required for conversion.

FIG. 2 shows a cross section of a commercially available steam injection heater 11 that can be used to heat the slurry provided for conversion according to the invention. The slurry is provided under pressure at 24 while the steam is provided through a pipe connecting to the heater at 23. Whirler 26 imparts a helical motion to the slurry to assure turbulence and more efficient mixing with the steam. Male nozzle 20 is positioned within female nozzle 21 in a manner such that the steam from chamber 25 is thoroughly mixed and completely condensed in the slurry coming through nozzle 20. The slurry is discharged from the heater through nozzle 22. Pressures, turbulences and motion within the constricted areas of the heater and delivery tube 3 should be sufficient to inhibit gelation of the slurry before it settles into reaction vessel 1.

FIG. 3 is a self-explanatory flow sheet which puts the process of the present invention in prespective within the sequence of processes used in producing calcium halophosphate phosphors and their subsequent use in lamps.

The $CaHPO_4.2H_2O$ is precipitated from aqueous solution by thoroughly mixing together aqueous solutions of a soluble calcium salt and an ammonium salt of phosphoric acid in desired proportions. The precipitate is then separated from the mother liquor, washed lightly with water to remove the bulk of the mother liquor and then reslurried with water in the desired concentration. The following balanced equation generally represents this chemical precipitation process.

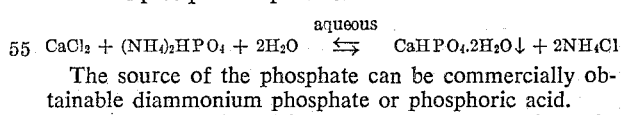

$$CaCl_2 + (NH_4)_2HPO_4 + 2H_2O \overset{aqueous}{\rightleftharpoons} CaHPO_4.2H_2O\downarrow + 2NH_4Cl$$

The source of the phosphate can be commercially obtainable diammonium phosphate or phosphoric acid.

The source of the calcium can be any commercially obtainable soluble salt with the chloride being preferred.

The phosphate and calcium molar concentrations can be varied from 0.5 to 3.0 molar with 2.5 molar being preferred for each.

The ammonium ($NH_4^+$) to phosphate ($PO_4^{3-}$) mole ratio can be varied through the preferred range of 1.6:1.0 to 2.0:1.0 by the addition of either phosphoric acid or ammonium hydroxide depending on the source of the phosphate.

These solutions are then metered as separate streams into a vigorously agitated vessel. The two streams are regulated to give a ten mole percent excess of calcium to phosphate. The resultant pH of the slurry varies between 3.5 and 5.5 depending on the $(NH_4^+)/(PO_4^{3-})$ mole ratio, percent excess of calcium chloride and precipitation temperature. The precipitation temperature can be varied between 35° C. and 45° C. by regulating the temperature at one or both of the reactants. It is preferable to precipitate at a pH between 3.5 and 4.8 and at a temperature between 35° C. and 45° C.

A preferred precipitation condition is to concurrently meter 2.5 molar diammonium phosphate solution with an $(NH_4^+)/(PO_4^{3-})$ mole ratio of 1.7:1.0 at 2.0 liters per minute and 2.5 molar calcium chloride solution at 2.2 liters per minute into a vigorously agitated vessel containing sufficient 0.01 molar phosphoric acid at the start to cover the agitator. The streams should enter the vessel at locations several inches apart. The solution temperatures should be adjusted to give a precipitation temperature between 35° C. and 45° C.

The precipitate is then separated from the mother liquor in a perforated basket centrifuge, or other suitable device, washed with water and then reslurried in water to give a solids concentration of about 12% by weight as dihydrate.

The dihydrate appearance varies with precipitation conditions from tight clusters of fine needles to large, well defined thin plates. The character of the dihydrate is known to influence the size of the recrystallized product produced under constant recrystallization conditions. Variations in the recrystallization conditions, particularly degree of agitation and temperature, can also affect particle size and particle size distribution of the recrystallized anhydrous phosphate.

Figure 4:
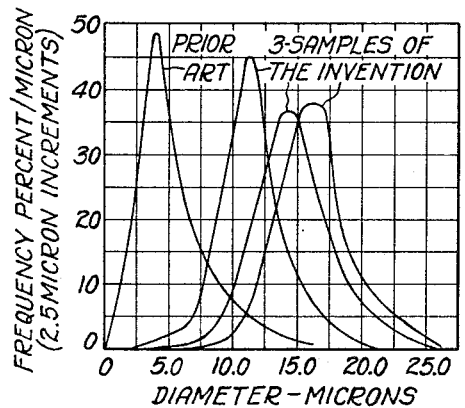
FIG. 4 is a graphical representation of particle size distributions of $CaHPO_4$ made according to the prior art and $CaHPO_4$ made according to the present invention.

FIG. 4 presents frequency distributions by count as determined with a Coulter Counter for a typical stirred batch recrystallized sample of the prior art as well as three products made on a continuous basis according to the present invention. It is readily apparent from FIG. 4 that the continuous method produces material of a substantially larger mean diameter and relatively free of fines. This is desirable for the production of improved phosphors.

The continuous recrystallizer used with the invention is essentially a top to bottom plug flow reactor that depends heavily on the formation of a relatively stiff gel for its performance. The dihydrate slurry is preferably fed to the slurry heater as reslurried without the addition of any additives. Should additives be used they must not reduce the viscosity of the gel to the point where back mixing can become pronounced nor should they inhibit recrystallization to the point where the residence time in the reactor is adequate to assure essentially complete conversion before discharge. It has been found experimentally that a residence time of at least 15 minutes will accommodate most dihydrate slurries and longer available residence times up to 30 minutes do no harm as long as the underflow is regulated to prevent the buildup of recrystallized solids.

Other conditions that can cause mixing in the reactor should be avoided. The most common of these are pumping air along with the slurry, loss of fluid flow which would allow steam to blow into the reactor, operating the slurry heater without sufficient back pressure to maintain the venturi throat of the slurry heater flooded to prevent free steam discharge, and discharging the slurry into the reactor at too high a speed (which can be minimized by allowing it to expand slightly in the inlet feed line).

No auxiliary heat needs to be provided for the reactor but it can be insulated to minimize heat losses and preheated with steam to facilitate start up. Reactors up to 30 gallons can be operated uninsulated and started up empty and cold. The underflow is opened when the overflow starts. Larger reactors with more surface usually require insulation and special start up procedures. They are usually preheated by purging with steam for several minutes, then filled with 0.01 molar phosphoric acid at 90–95° C. The flow of heated dihydrate slurry is then started, and after 10 minutes the underflow is started and checked for completeness of conversion before it is retained as product. Conversion is generally complete within 15 minutes after start up.

The maximum feed rate is regulated by the rate at which conversion occurs and the need to minimize turbulence at the inlet. A feed rate of two gallons per minute of 12% by weight dihydrate slurry for each 30 gallons of effective reactor volume has been found to be near maximum to accommodate most dihydrate slurries, with two gallons per minute for each forty gallons of capacity being preferred when the recrystallization temperature is between 88° C. and 95° C. Above 95° C., higher rates can be tolerated since conversion time decreases with increasing temperature, but particle size also varies inversely with temperature, and particle size needs can also impose a limitation on the operating temperature and feed rates. It is preferable to operate in the 90° C. to 95° C. temperature range.

The effective reactor volume is that volume above the screen and below the inlet. The residence time in the volume contained in the conical section below the screen is small and useful only in providing a delay in the path between the location where conversion is occurring on the screen and the discharge to assure that conversion is essentially complete before discharge. The conversion from the dihydrate to the anhydrous salt has been found to be endothermic and there is a pronounced temperature drop at the screen indicating that conversion occurs at the gel-screen interface.

It is preferable to maintain the diameter between sixteen and twenty-four inches, to have the overflow about eight inches above the inlet and to allow about twelve inches of freeboard space above the overflow to minimize the hazard of boiling over should free steam be blown into a full reactor. A loose fitting cover is also provided to reduce heat losses. The reactor height is a function of capacity and is limited by the hydrostatic pressure on the screen which will force the dihydrate gel through it. Six to eight feet is a safe working limit but not necessarily the maximum feasible.

The foregoing is a description of an illustrative embodiment of the invention, and it is applicant's intention in the appended claims to cover all forms which fall within the scope of the invention.

What I claim as new and desire to secure by Letters Patent of the United States is:

1. A process of converting $CaHPO_4.2H_2O$ in an aqueous slurry to $CaHPO_4$ comprising the following steps:

heating said slurry to a temperature above about 78° C., conveying said heated slurry to a reaction vessel and allowing it to increase in viscosity to a gel-like material within said reaction vessel, said gel-like material being supported within said reaction vessel on and above a perforated member which has perforations of sizes suitable to allow the converted $CaHPO_4$ and water to pass therethrough but small enough to retard passage of said gel-like material, said $CAPHO_4.2H_2O$ converting to $CaHPO_4$ in the vicinity of said perforated member, and said converted $CaHPO_4$ falling through said perforations, removing said converted $CaPHO_4$ as an aqueous slurry from below said perforated member.

2. A process according to claim 1 in which said slurry is heated to a temperature in the range of about from 85° C. to 99° C.

3. A process according to claim 1 in which said perforated member is a wire mesh screen having openings no larger than about 0.2 inch square.

4. A process according to claim 1 in which said slurry is provided to said reaction vessel beneath the surface of excess water generated by the conversion and in which an overflow is provided to permit a portion of the water produced from the conversion of the gel-like material which percolates upwardly through the gel material to be removed at a level above the level at which the slurry is provided to the reaction vessel, and in which the flow of converted slurry is controlled by regulating the proportions of water in the overflow to water in the converted slurry below said perforated member.

5. A process according to claim 1 in which the reaction vessel has an upwardly opening conical shape below said perforated member and in which said conical shape is vibrated to enhance movement of said converted slurry out of said reaction vessel.

6. A process according to claim 1 in which said heating is done by means of steam injection into a constricted, pressurized moving stream of said slurry and in the same direction as the movement of said slurry so that said slurry is heated to the desired temperatures rapidly and while under sufficient pressure and agitation to prevent gelation before said slurry is conveyed to said reaction vessel.

No references cited.

OSCAR R. VERTIZ, *Primary Examiner.*

L. A. MARSH, *Assistant Examiner.*